(12) United States Patent
Zohar et al.

(10) Patent No.: US 7,934,120 B2
(45) Date of Patent: Apr. 26, 2011

(54) STORING DATA REDUNDANTLY

(75) Inventors: Ofir Zohar, Alfe-Menashe (IL); Efri Zeidner, Kiryat Mozkin (IL); Shemer Schwartz, Tel Aviv (IL); Yair Chuchem, Omer (IL)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 11/518,731

(22) Filed: Sep. 11, 2006

(65) Prior Publication Data

US 2008/0126912 A1    May 29, 2008

(51) Int. Cl.
*G06F 11/00* (2006.01)

(52) U.S. Cl. ............... 714/6; 711/114; 711/162

(58) Field of Classification Search ...... 714/6; 711/114, 711/161, 162
See application file for complete search history.

(56) References Cited

U.S. PATENT DOCUMENTS

| | | | |
|---|---|---|---|
| 6,928,578 B2* | 8/2005 | Archibald et al. | 714/6 |
| 6,934,804 B2* | 8/2005 | Hashemi | 711/114 |
| 7,103,716 B1* | 9/2006 | Nanda | 711/114 |
| 7,188,270 B1* | 3/2007 | Nanda et al. | 714/6 |
| 7,234,024 B1* | 6/2007 | Kiselev | 711/114 |
| 7,263,629 B2* | 8/2007 | Corbett et al. | 714/6 |
| 7,406,621 B2* | 7/2008 | Lubbers et al. | 714/6 |
| 2002/0166077 A1* | 11/2002 | Jacobson | 714/6 |
| 2004/0143637 A1* | 7/2004 | Koning et al. | 709/212 |
| 2005/0076260 A1* | 4/2005 | Hung | 714/6 |
| 2005/0114594 A1* | 5/2005 | Corbett et al. | 711/114 |
| 2005/0166083 A1* | 7/2005 | Frey et al. | 714/6 |
| 2006/0129873 A1* | 6/2006 | Hafner | 714/5 |

* cited by examiner

*Primary Examiner* — Yolanda L Wilson
(74) *Attorney, Agent, or Firm* — Griffiths & Seaton PLLC

(57) ABSTRACT

A method for storing data blocks, including forming the data blocks into groups comprising N·M data blocks, where N and M are different positive integers. For every group, the N·M data blocks are assigned to correspond to elements of an array comprising N rows and M columns. A respective parity block is calculated for each of the N rows and M columns, to form (N+M) parity blocks. The resulting (N+M) parity blocks and N·M data blocks are stored in respective storage devices.

20 Claims, 6 Drawing Sheets

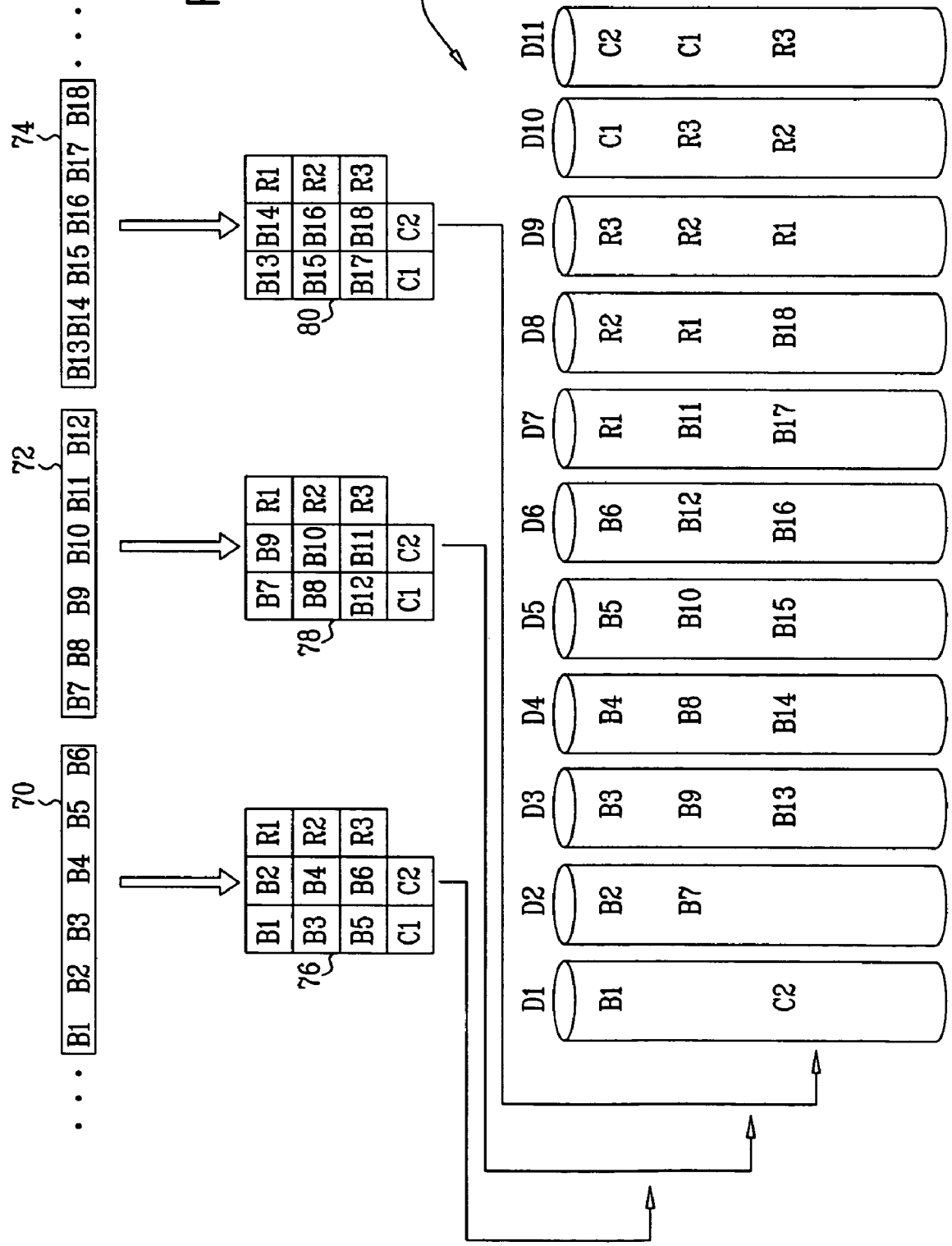

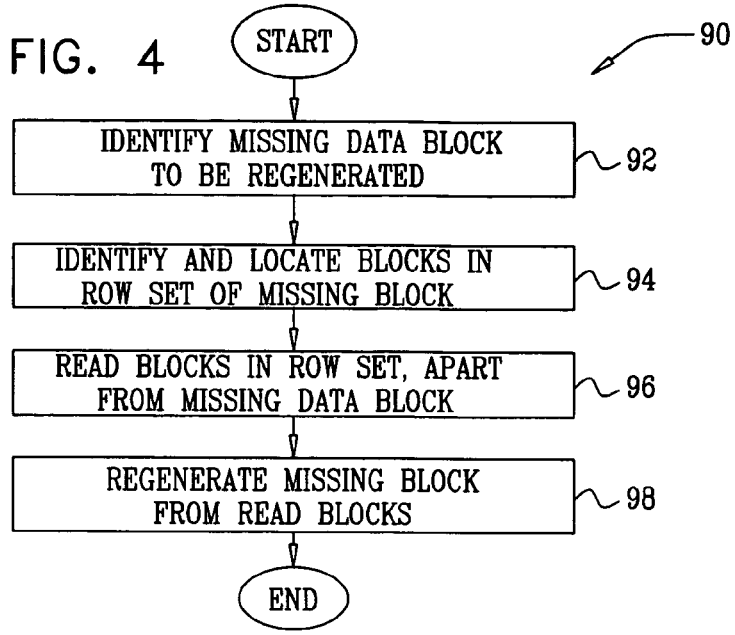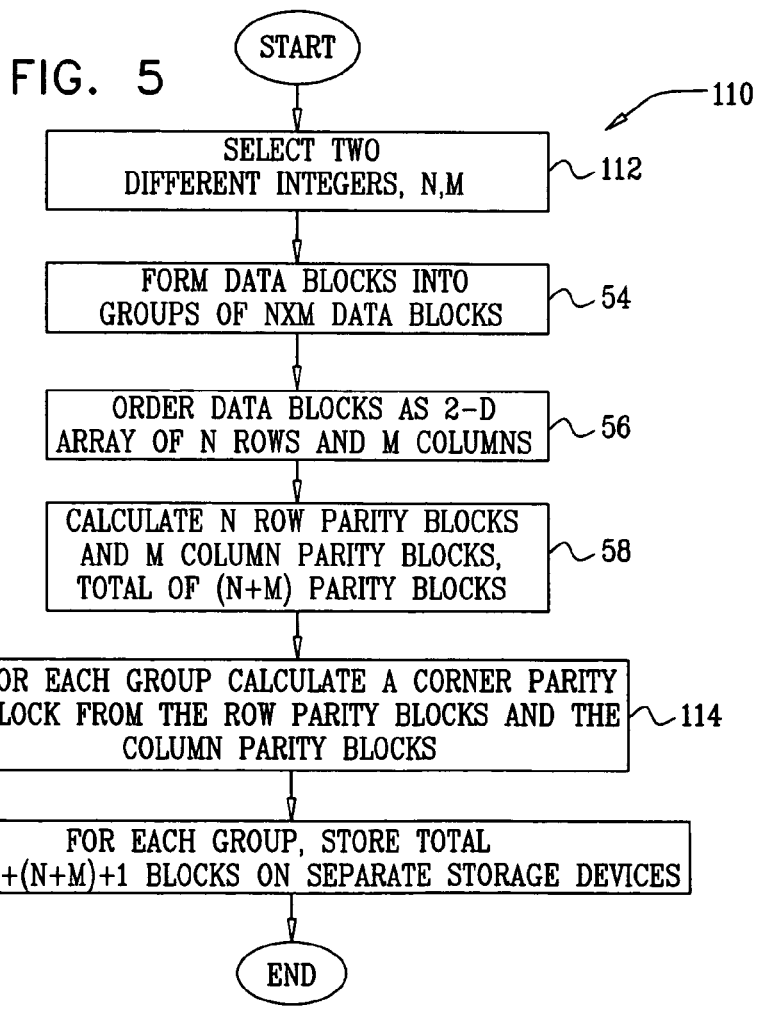

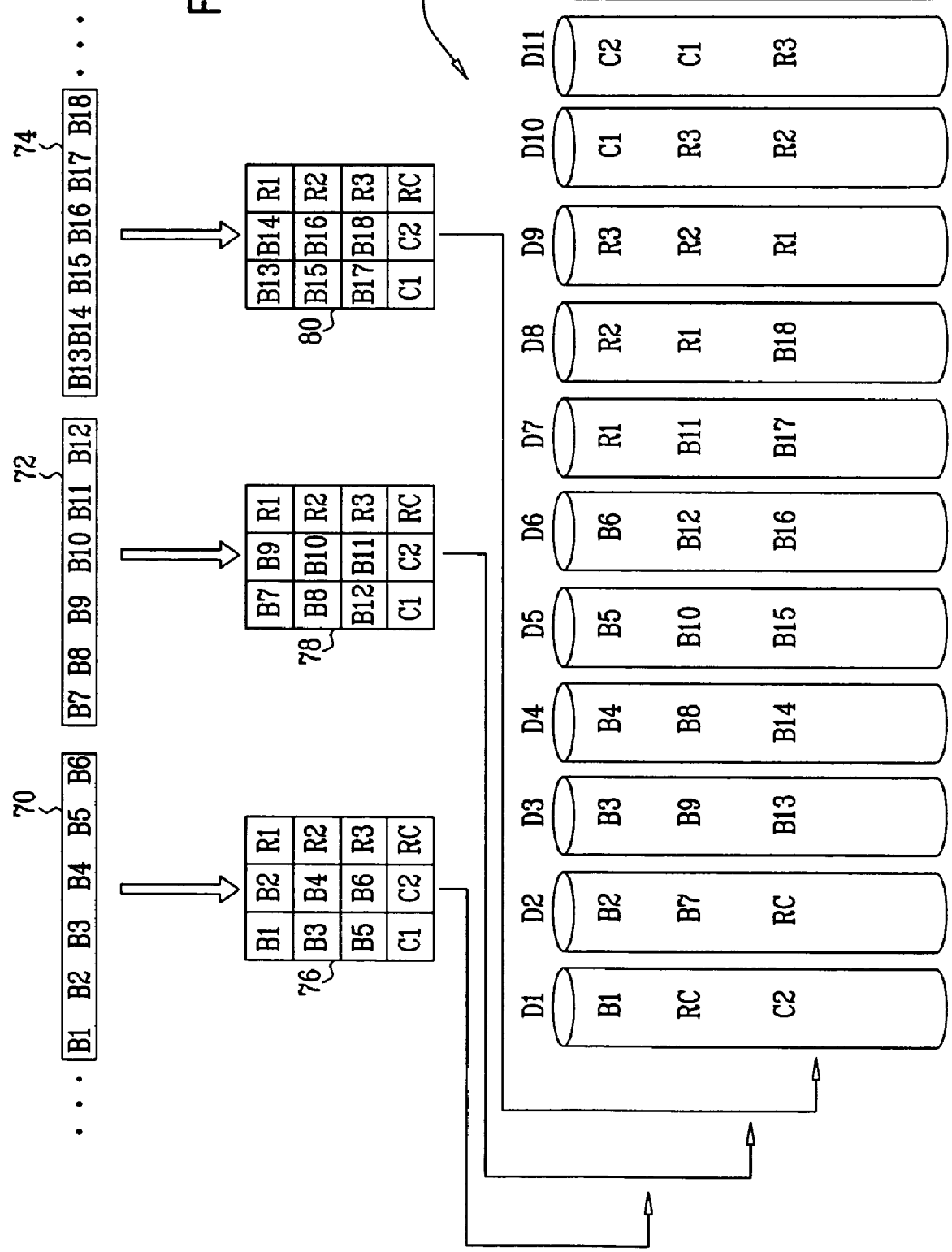

STORING DATA REDUNDANTLY

FIELD OF THE INVENTION

The present invention relates generally to data storage, and specifically to storing the data in a redundant manner.

BACKGROUND OF THE INVENTION

Methods for protecting data in a mass storage system are well known in the art. Some of these methods include different schemes of RAID (Redundant Array of Independent Disks), defined by the Raid Advisory Board at the University of Berkeley, Calif. For example, RAID 1 provides protection by holding two separate copies of data on separate storage devices, so that complete recovery from failure of one storage device is possible. Other RAID schemes use parity blocks to allow for recovery from a storage device failure. For example, RAID 6 uses two parity blocks, and storage systems constructed according to the RAID 6 scheme can completely recover from failure of two storage devices.

A number of variations of RAID 6 are known in the art. One variation is described in "EVENODD: An Optimal Scheme for Tolerating Double Disk Failures in RAID Architectures" by Blaum et al., *IEEE Transactions on Computers*, 44 (1995). The EVENODD system uses two exclusive disjunction (XOR) parity blocks.

A second variation is described by Newberg et al. in "String layouts for a redundant array of inexpensive disks", *Algorithmica* 12 (2-3), 209-214 (1997). The system described by Newberg arranges data blocks in a square array, and calculates a parity block for each row and each column of the array. The data blocks and the parity blocks are stored in separate storage devices.

However, an improvement to known methods of data storage is desirable.

SUMMARY OF THE INVENTION

In embodiments of the present invention, data in the form of data blocks is stored on a plurality of storage devices. The data is stored in such a way that on failure of any two of the storage devices, the data is completely recoverable. A processor forms the data blocks into groups of N·M data blocks, where N and M are two different integers. Herein it is assumed, by way of example, that N>M. For every group, the processor assigns each of the data blocks to correspond to a respective element of an array having N rows and M columns. For each row of the array, the processor calculates a parity block, thus forming N row parity blocks. For each column of the array, the processor also calculates a parity block, forming M column parity blocks. The parity blocks may be calculated by any method known in the art, for example, by XORing.

For each group the processor stores the (N+M) parity blocks and the N·M data blocks in different respective storage devices. On failure of any two of the storage devices, the processor is able to recalculate the data blocks of the failed devices from the data blocks and parity blocks in the remaining devices. On failure of one of the storage devices, the processor is able to recover every given data block using the remaining data blocks in its row and the row parity block. Since there are fewer data blocks in the rows than in the columns, recovering the data block using the remaining row elements is faster than recovering the data block using the remaining column elements. The rate of recovery is also faster compared to the rate achieved if the data blocks are stored in a square array. Thus, by storing the data blocks as a rectangular array, the rate of recovery for a given data block is enhanced. Furthermore, every data block is recovered at substantially the same enhanced rate, since similar recovery operations are performed for every block.

In an alternative embodiment, the processor stores a further parity block, formed from the (N+M) parity blocks described above, on the storage devices. The extra parity block allows for complete recovery from failure of up to three storage devices, while maintaining the fast recovery for a given data block, as described above.

By choosing dimensions of the rectangular array within which the groups are arranged, the rate of recovery for a given data block may be selected. For example, a group of 60 data blocks may be arranged in a first array of 20 rows and 3 columns, or a second array of 10 rows and 6 columns. The first array gives a rate of recovery for a given data block that is approximately twice the rate of the second array.

There is therefore provided, according to an embodiment of the present invention, a method for storing data blocks, including:

forming the data blocks into groups of N·M data blocks, where N and M are different positive integers;

for every group, assigning the N·M data blocks to correspond to elements of an array having N rows and M columns;

calculating respective parity blocks for each of the N rows and M columns, to form (N+M) parity blocks; and storing the (N+M) parity blocks and the N·M data blocks in respective storage devices.

Typically, the respective storage devices consist of S storage devices, wherein $S \geq N \cdot M + (N+M)$.

In an embodiment, storing the parity blocks and the data blocks consists of distributing the parity blocks and the data blocks evenly over the storage devices.

In some embodiments the data blocks are conveyed to the storage devices in a sequence, and assigning the N·M data blocks to correspond to elements in the array consists of assigning the data blocks to the array according to the sequence.

In alternative embodiments the data blocks are conveyed to the storage devices in a sequence, and assigning the N*M data blocks to correspond to elements in the array consists of assigning the data blocks to the array independently of the sequence.

In another embodiment, the method includes calculating a further parity block from the (N+M) parity blocks, and storing the further parity block on a further storage device, different from the respective storage devices. Typically, there are a total of S storage devices, wherein $S \geq N \cdot M + (N+M) + 1$.

There is further provided, according to an embodiment of the present invention, a method for recovering a given data block from a plurality of data blocks, including:

forming the plurality of data blocks into groups comprising N·M data blocks, where N and M are positive integers and N>M;

for every group, assigning the N·M data blocks to correspond to elements of an array comprising N rows and M columns, wherein the given data block is in a respective row including the given data block and other data blocks in the respective row;

calculating respective parity blocks for each of the N rows and M columns, to form (N+M) parity blocks, the parity blocks including a respective-row parity block formed from the given data block and the other data blocks;

storing the (N+M) parity blocks and the N·M data blocks in respective storage devices; and regenerating the given data block using the other data blocks and the respective-row parity block.

Typically, the values for N and M are selected in response to a rate of recovery for the given data block.

There is further provided, according to an embodiment of the present invention, apparatus for storing data blocks, including:

a plurality of storage devices; and a processor which is configured to:

form the data blocks into groups including N·M data blocks, where N and M are different positive integers, for every group, assign the N·M data blocks to correspond to elements of an array of N rows and M columns, calculate respective parity blocks for each of the N rows and M columns, to form (N+M) parity blocks, and store the (N+M) parity blocks and the N·M data blocks in respective storage devices included in the plurality of storage devices.

There is further provided, according to an embodiment of the present invention, a method for configuring storage devices to store data blocks, including:

forming data block logical addresses (LAs) for the devices into groups including N·M LAs, where N and M are different positive integers;

for every group, assigning the N·M data block LAs to correspond to elements of an array comprising N rows and M columns;

assigning N row parity block LAs and M column parity block LAs, to form (N+M) parity block LAs; and forming a mapping between the (N+M) parity block LAs and the N·M data block LAs and respective storage devices.

Typically, the method includes, for each group of N·M LAs, arranging N·M respective data blocks in response to the array, calculating parity blocks for the data blocks, and storing the parity blocks and the data blocks in response to the mapping.

The present invention will be more fully understood from the following detailed description of the embodiments thereof, taken together with the drawings in which:

BRIEF DESCRIPTION OF THE DRAWINGS

FIG. 3 is a diagram illustrating the process of FIG. 2, according to an embodiment of the present invention;

FIG. 4 is a flowchart showing steps of a process in regenerating a data block in the storage system, according to an embodiment of the present invention;

FIG. 5 is a flowchart showing steps of an alternative process in storing data blocks, according to an embodiment of the present invention; and FIG. 6 is a diagram illustrating the alternative process of FIG. 5, according to an embodiment of the present invention.

DETAILED DESCRIPTION OF EMBODIMENTS

Figure 1:
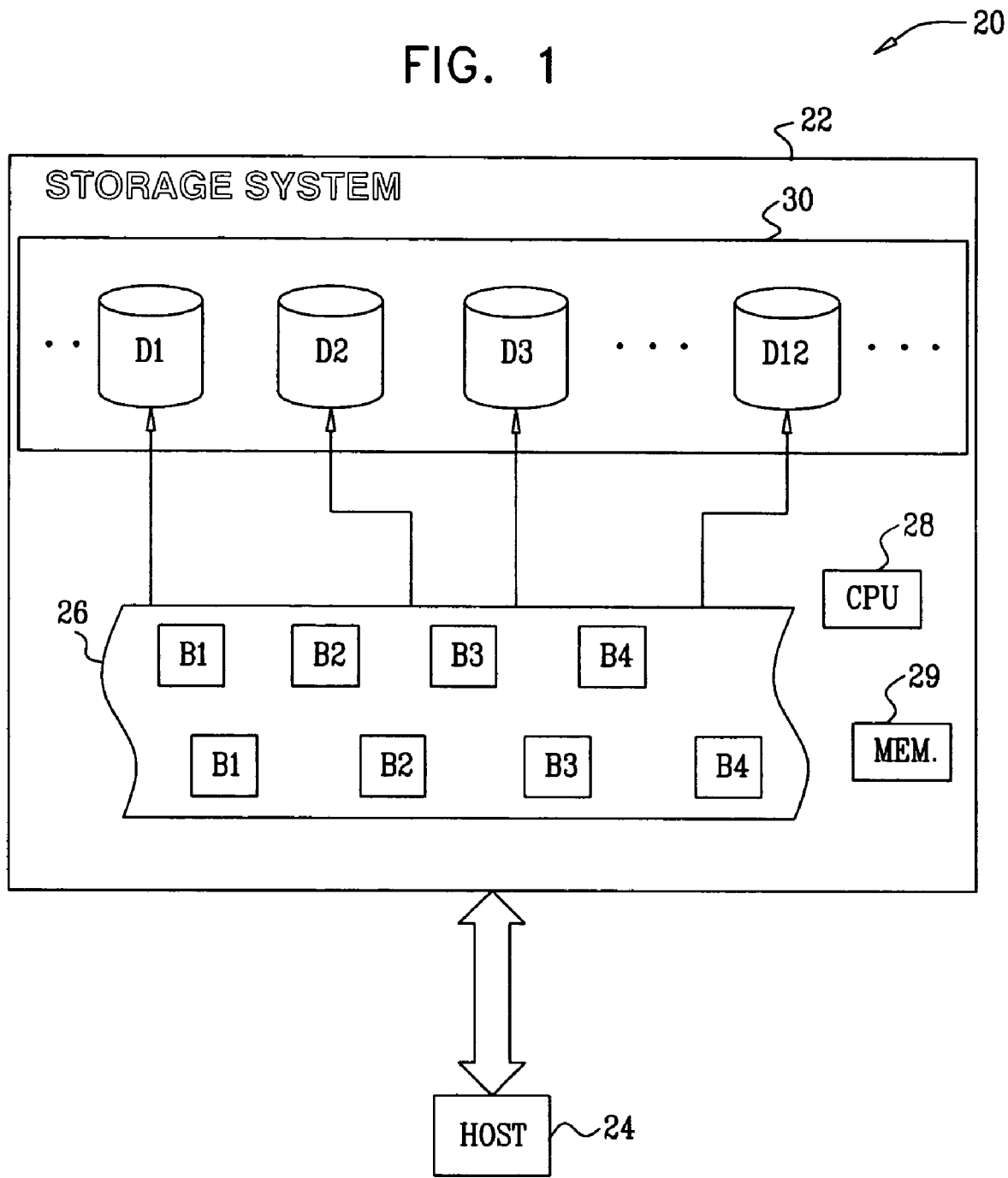
FIG. 1 illustrates a data processing network, according to an embodiment of the present invention.

Reference is now made to FIG. 1, which illustrates a data processing network 20, according to an embodiment of the present invention. Network 20 comprises a data storage system 22 and a host 24. System 22 comprises a processing unit 28 which manages operations of the system. Processing unit 28 may comprise one or more processing units and/or central processing units (CPUs), which may typically be distributed. Herein, by way of example, processing unit 28 is assumed to be one CPU, referred to hereinbelow as CPU 28. The CPU uses a memory 29, which typically comprises non-volatile and/or volatile components, in performing its operations. System 22 also comprises a multiplicity, S, of storage devices 30. In embodiments of the present invention, the number of storage devices used may be any number equal to or greater than five, although typically the number of storage devices used is of the order of tens or hundreds. Herein, by way of example, there are assumed to be 12 storage devices 30, which are also referred to as devices D1, D2, . . . , D12. Storage devices 30 may be magnetic disk drives, or solid-state, random access memory (RAM) disks, or any other devices used for storing non-volatile data, or any combination of such devices. Storage devices 30 are typically controlled by one or more controllers.

Host 24 communicates with system 22 in order to read data from, or write data to, the system. For example, host 24 sends data 26 to be written to and distributed over storage devices 30. Data 26 is in the form of data blocks BI, where I is a positive integer, and the blocks are referred to herein generically as data blocks B. By way of example, data blocks B are assumed to have a size of eight bits, but the data blocks may be of substantially any integral number of bits, the size may range from less than eight bits to gigabytes or more, and the size of the blocks is not necessarily equal. As is explained in more detail below, every data block B is associated with a row parity block and a column parity block. CPU 28 calculates the two parity blocks, and stores the data block and its associated parity blocks on separate storage devices 30. In the specification and in the claims, a parity block is a data block, calculated for a set of data blocks, which provides redundancy to the set by enabling any given member of the set to be reconstructed from the parity block and the remaining members of the set.

Figure 2:
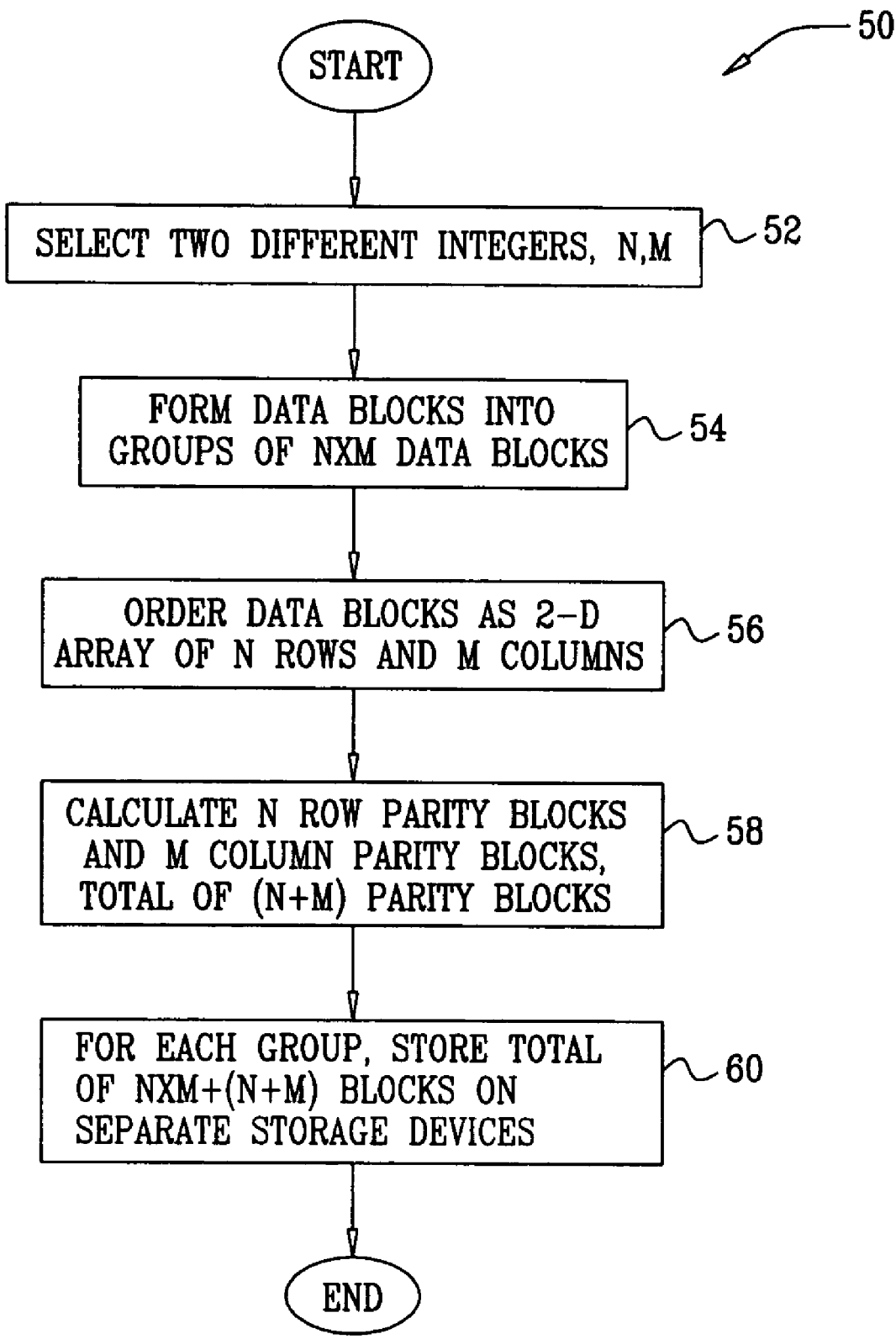
FIG. 2 is a flowchart showing steps of a process in storing data blocks in a storage system, according to an embodiment of the present invention.

FIG. 2 is a flowchart 50 showing steps of a process performed by CPU 28 in storing data blocks B, and FIG. 3 is a diagram illustrating the process, according to embodiments of the present invention. Operation of flowchart 50 allows storage system 22 to achieve complete recovery on failure of one or two storage devices 30.

In a first step 52, CPU 28 selects two positive integers, N, M, according to expression (1):

$$\begin{cases} N > M, N, M \in I^+ \\ N \cdot M + N + M \leq S \end{cases} \quad (1)$$

For the 12 storage devices 30 exemplified herein, possible values of (N,M) that the CPU could choose are: (2,1), (3,1), (4,1), (5,1), and (3,2). Herein CPU 28 is assumed to choose (N,M)=(3,2).

In a second step 54, CPU 28 forms the data blocks into groups, each group consisting of N·M data blocks. The data blocks of each group are formed to be equal in size, if necessary by CPU 28 padding a block or blocks of the group with zeros or null characters. For N=3, and M=2, the CPU forms groups of 6 data blocks. FIG. 3 shows three groups 70, 72, and 74 formed by the CPU: {B1, B2, B3, B4, B5, B6}, {B7, B8, B9, B10, B11, B12}, and {B13, B14, B15, B16, B17, B18}.

In a third step 56, for each group the CPU considers the data blocks of the group as a two-dimensional array $\{B_{n,m}|n=1,\ldots,N;m=1,\ldots,M\}$, where $B_{n,m}$ represents any one of the data blocks B. Examples of two-dimensional arrays are arrays

76, 78, and 80 (FIG. 3). As illustrated for arrays 76 and 80 the data blocks may be arranged sequentially to correspond with elements of an array, the sequence of arrangement corresponding to the sequence in which data blocks B are transmitted to system 22. However, the CPU may use any convenient method of arrangement, including positioning the data blocks B of the group independently of the sequence, such as is exemplified in array 78, to correspond with elements of the array.

In a fourth step 58, for each group the CPU calculates a respective parity block R1, ..., RN for each of the N sets $\{B_{1,m}|m=1,\ldots,M\},\ldots,\{B_{N,m}|m=1,\ldots,M\}$. Parity blocks R1, ..., RN are also herein termed row parity blocks. The CPU also calculates a respective parity block C1, ..., CM for each of the M sets $\{B_{n,1}|n=1,\ldots,N\},\ldots,\{B_{n,M}|n=1,\ldots,N\}$. Parity blocks C1, ..., CM are also herein termed column parity blocks. The CPU thus forms (N+M) parity blocks, i.e., N row parity blocks and M column parity blocks for each group of data blocks. In sequential array 76, the N sets for group 70 correspond to sets {B1, B2}, {B3, B4}, {B5, B6} formed by the three rows of the array, and the M sets for the group correspond to sets {B1, B3, B5}, {B2, B4, B6} formed by the two columns of the array. In array 78, the N sets are {B7, B9}, (B8, B10}, {B12, B11} and the M sets are {B7, B8, B12}, {B9, B10, B11}. Following the terminology defined above for parity blocks, the parity blocks for each group 70, 72, and 74 are R1, R2, R3, C1, and C2. Herein, to clarify to which group a particular parity block belongs, the group may be written as a suffix in parentheses. Thus R2(72) corresponds to the second row parity block of group 72. In FIG. 3, the relationship of the parity blocks to their respective sets is shown by adding the parity block to a row or column of the array, as appropriate.

The parity blocks in embodiments of the present invention may be calculated according to any convenient method, such as by using exclusive disjunctions (XORs) or by Reed-Solomon encoding. Inspection of FIG. 3, and consideration of the criteria used in the process described above in step 58, shows that for every data block B there is one row parity block and one column parity block associated with the data block. For example, in group 70 data block B3 is associated with R2 and C1. The two parity blocks may be calculated by the same or different methods. Herein, by way of example, it is assumed that both parity blocks are calculated by XORing.

Consideration of FIG. 3 shows that each given data block is at the intersection of two sets of blocks. A first set comprises a row of data blocks and a row parity block; a second set comprises a column of data blocks and a column parity block. The first and second sets are also herein termed the row set and the column set for the given data block. The two sets are disjoint apart from their intersection at the given data block.

In a fifth step 60, CPU 28 stores each of the data blocks in a group, and the parity blocks associated with the group, on separate storage devices 30. For each group, the total number of blocks stored is N·M+(N+M). As described below, the method of storage depends on the number S of storage devices.

If S=N·M+(N+M), then each block is stored on one of the devices, each of the devices receiving one block. Typically, data blocks and parity blocks of succeeding groups are stored in a distributed manner, for instance by cyclically or randomly storing the blocks within the devices, so that data blocks and parity blocks are substantially evenly distributed over devices 30.

If S≧N·M+(N+M), then each block is stored on one of the devices, with at least one of the devices not receiving a block. Typically, for succeeding groups, CPU 28 stores each set of blocks in a group on different devices, so that the devices are equally used. For example, for the 12 storage devices illustrated in FIG. 3, the 11 blocks of group 70 are stored on devices D1, ..., D11, the 11 blocks of group 72 are stored on devices D2, ..., D12, and the 11 blocks of group 74 are stored on devices D1, D3, ..., D12.

CPU 28 records in memory 29 an indication of the locations of the blocks stored on devices 30, so as to be able to read the stored data from the devices. The CPU also records in memory 29, and/or on storage devices 30, one or more indicators that allow the CPU to determine the parity blocks associated with a given data block, as well as the other data blocks in the disjoint sets associated with the given data block. In some embodiments of the present invention, rather than recording location indications and block indicators, a process in the form of code is stored in memory 29. Typically the process reconstructs a method by which the CPU determined the grouping of the blocks, and the locations to which they are stored. Implementing the code allows the CPU to determine values of stored blocks and their respective locations. Typically, the storage of the blocks in devices 30, and the recording of the indication of the locations and the indicators, is performed atomically.

Flowchart 50 ends when all data blocks B have been stored in system 22.

Flowchart 50 describes the process for storing data blocks B. When any given data block B is modified after having been stored, the row parity block and the column data block associated with the given data block are recalculated. The write operations required for the modification, i.e., rewriting the given data block and its two associated parity blocks, are typically performed as an atomic operation.

FIG. 4 is a flowchart 90 showing steps of a process performed by CPU 28 in regenerating one of data blocks B, according to an embodiment of the present invention. CPU 28 typically implements flowchart 90 when data blocks on one of storage devices 30 have become unavailable, for example, by the storage device failing or data on it becoming corrupted. In this case, flowchart 90 may be advantageously applied to regenerate all the data blocks of the device.

In a first step 92, the CPU identifies the data block to be regenerated. The block to be regenerated is herein termed the "missing" data block.

In a second step 94, the CPU identifies the blocks comprised in the row set of the missing data block, and also determines the locations of the blocks. The identification and location determination are typically by referring to memory 29.

In a third step 96, the CPU reads the blocks comprised in the row set, apart from the missing data block, from the locations found in step 94. The read blocks include the row parity block of the missing data block.

In a final step 98, CPU 28 uses the values of the read blocks to regenerate the missing block. The method for regeneration depends on how the row parity block has been generated. For example, if the row parity block has been formed by XORing, then an XOR process is applied to the blocks read in step 96 to generate the missing block.

FIG. 3 may be used to illustrate the operation of flowchart 90. For example, if device D4 has failed, then data blocks B4, B8, and B14, in respective groups 70, 72, and 74 are missing blocks. In group 70, the blocks in the corresponding row of B4 are data block B3 and parity block R2(70); in group 72 the blocks in the corresponding row of B8 are data block B10 and parity block R2(72); and the blocks in the corresponding row of B14 are data block B13 and parity block R1(74). Thus, CPU 28 regenerates B4 by XORing B3 and R2(70); B8 by XORing B10 and R2(72); and B14 by XORing B13 and R1(74).

Arrays used by embodiments of the present invention are rectangular, having different numbers of rows and columns. If a missing data block in one of the arrays needs to be regenerated, then using the set of elements having the fewest number of remaining elements for regeneration is the fastest way to regenerate the missing element. Flowchart 90 applies this logic to the regeneration of a missing data block.

It will be appreciated that the rate of regeneration for flowchart 90 can be adjusted by selecting the dimensions of the arrays used for generating the parity blocks. For example, if there are 85 storage devices in system 22, then expression (1) gives possible values for N,M as (20,3) and (10,6). However, apportioning the data blocks into arrays having dimensions 20·3 gives the system the ability to recover from a device failure at approximately twice the rate compared to the rate for apportioning the data blocks into arrays of dimensions 10·6.

By having two parity blocks for each data block, embodiments of the present invention allow for complete recovery caused by failure of two of storage devices 30. Consideration of FIG. 3 shows that operation of flowchart 90 alone may be used to recover from such a double device failure. For example, if data on devices D3 and D5 becomes inaccessible, CPU can implement flowchart 90 a total of six times, to regenerate inaccessible data blocks B3, B9, B13, B5, B10, and B15. Thus, operation of flowchart 90 twice gives complete recovery from a double device failure for data blocks of a given group that are in separate rows. In these failure cases, the flowchart uses two different row parity blocks, one for each of the missing data blocks.

FIG. 5 is a flowchart 110 showing steps of an alternative process performed by CPU 28 in storing data blocks B, and FIG. 6 is a diagram illustrating the alternative process, according to embodiments of the present invention. Apart from the differences described below, the operation of flowchart 110 is generally similar to that of flowchart 50 (FIG. 3), such that steps indicated by the same reference numerals in both flowchart 100 and flowchart 50 are generally identical in implementation. Operation of flowchart 110 allows storage system 22 to achieve complete recovery on failure of one, two, or three storage devices 30.

In a first step 112, CPU 28 selects two positive integers, N, M, according to expression (2):

$$\begin{cases} N > M, N, M \in I^+ \\ N \cdot M + N + M + 1 \leq S \end{cases} \quad (2)$$

Herein CPU 28 is assumed to choose (N,M)=(3,2).

Steps 54, 56, and 58 are substantially as described above with respect to flowchart 50.

In a step 114, for each group the CPU calculates a parity block, herein termed a corner parity block, for all the row parity blocks, R1, . . . , RN, and all the column parity blocks C1, . . . CM. The corner parity block is symbolized in FIG. 6 with the identifier "RC."

In a final step 116, CPU 28 stores each of the data blocks in a group, the parity blocks associated with the group, and the corner parity block on separate storage devices 30. For each group, the total number of blocks stored is N·M+N+M+1. The method of storage is substantially as described for step 60 (FIG. 2). FIG. 6 illustrates the storage of respective RC corner parity blocks in devices 30, so that data and parity blocks of a given group are stored on separate devices.

As is also described for step 60, in step 116 CPU 28 records indications of locations of the stored blocks, and indicators that enable the CPU to determine the parity blocks associated with a given data block, as well as the other data blocks in the disjoint sets associated with the given data block. In addition, the CPU records an indicator for the corner block.

After storing blocks in system 22 according to flowchart 110, recovery from failure of one storage device is completely achieved by CPU 28 implementing flowchart 90. In addition, as described above, multiple applications of flowchart 90 may give recovery from two or three device failures. Furthermore, the same factors of increased rate described above for flowchart 90 apply to blocks stored according to flowchart 110.

Flowchart 110 describes the process for storing data blocks B, each data block having a row and a parity block associated with it. In addition, there is a corner block associated with the group of data blocks. When any given data block B is modified after having been stored according to flowchart 110, the row and column parity blocks associated with the given data block, and the corner block of the group, are recalculated. The write operations required for the modification, i.e., rewriting the given data block and its three associated parity blocks, are typically performed as an atomic operation.

In addition to storing data blocks, embodiments of the present invention may configure storage devices 30 for future storage of data blocks. Such future storage may occur after some data blocks have already been stored on devices 30, typically according to flowchart 50 or 110. Alternatively, the future storage may occur if no data has been stored on devices 30.

The configuration for future storage follows generally similar steps to those of flowcharts 50 and 110. However, rather than storing actual data blocks, the storage system is adapted to produce mappings for the future storage of data blocks. The mappings are stored in memory 29 (FIG. 1) and are accessed by CPU 28 as the storage system receives data blocks for storage.

Figure 7:
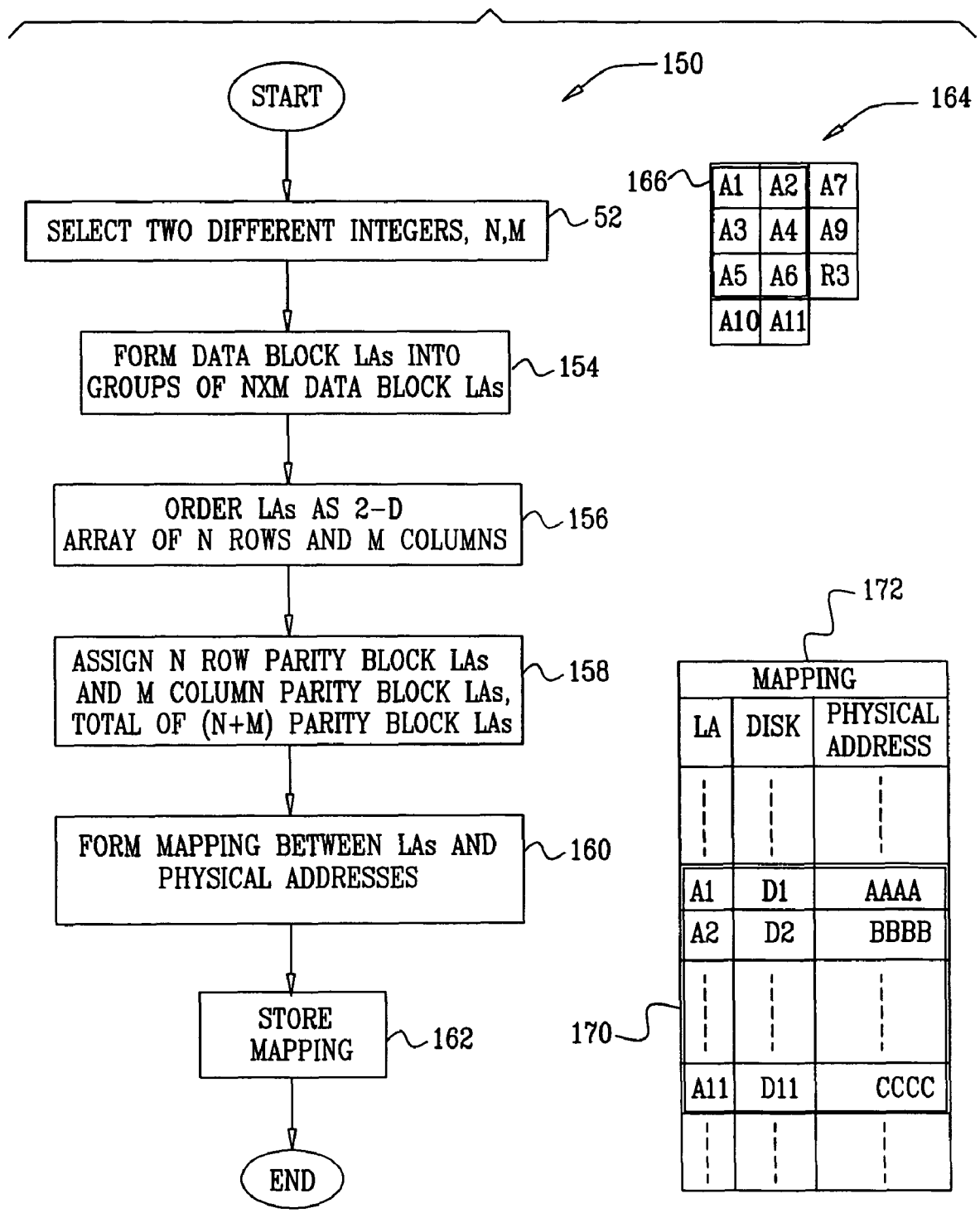
FIG. 7 is a diagram of a flowchart and of a mapping produced by the flowchart, according to an embodiment of the present invention.

FIG. 7 is a diagram of a flowchart 150 and of a mapping 172 produced by the flowchart, according to an embodiment of the present invention. Flowchart 150 gives steps for forming a mapping for data blocks that are to be stored with row and column parity blocks, as described above with reference to flowchart 50 (FIG. 3). The first step of flowchart 150 is identical to step 52 of flowchart 50. The relation between N, M, and the number of storage devices S required for implementation of flowchart 150 is given by expression (1) above. In a second step 154, CPU 28 forms data block logical addresses (LAs) into groups of N×M LAs. In a step 156, the CPU orders the data block LAs into a two-dimensional array of N rows and M columns. In a step 158, the CPU assigns N row parity block LAs and M column parity block LAs to the respective rows and columns of the two-dimensional array. In a step 160, the CPU forms a mapping between the LAs and physical addresses on storage devices 30, assigning each logical address to a different storage device. In a final step 162, CPU 28 stores the mapping in memory 29.

Diagram 164 illustrates the application of steps 52, 154, and 156 to logical addresses A1, A2, . . . , A11. In step 52 CPU 28 is assumed to choose (N,M)=(3,2). Logical addresses A1, A2, . . . , A6 are ordered into 3×2 rectangular array 166. Logical addresses A7, A8, A9 are the row parity block addresses, and A10, A11 are the column parity block addresses.

Mapping 170 is a mapping produced by CPU 28 for the logical addresses, corresponding to step 160. Each logical address A1, A2, . . . , A11 is mapped to a different storage device, D1, D2, D11, having a respective physical address on the storage device.

Mapping 170 exemplifies mapping of logical addresses of storage system 22 to physical addresses on devices 30. Typically, CPU 28 maps some or all of the logical addresses of system 22 to physical addresses, producing a system mapping 172 which is stored, in step 162, in memory 29.

As data blocks are received by system 22, CPU 28 accesses mapping 172 to determine in which storage device, and to which address in the storage device, the data blocks are to be stored. CPU 28 also accesses the mapping to determine in which storage devices and at which addresses the parity blocks, that the CPU calculates for the data blocks, are to be stored.

Those having ordinary skill in the art will be able to adapt flowchart 150, mutatis mutandis, for groups of data block addresses having other numbers of parity block addresses, such as a row parity block address, a column parity block address, and a corner parity block address, generally similar to those described above with respect to FIG. 5 and FIG. 6. For such an example, the relation between N, M, and the number of storage devices S is given by expression (2) above.

The embodiments above have been described for grouping data blocks or logical addresses in system 22 using (N,M) where N, M are different integers. It will be understood that storage system 22 is typically configured to use one selection of (N,M). It will also be understood that system 22 may be configured to group data blocks or logical addresses using more than one selection of (N,M). For example, one set of data blocks/logical addresses may be stored/assigned in system 22 using N=3, M=2, and another set of data blocks/logical addresses may be stored/assigned in the system using N=2, M=1.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for storing data blocks, comprising:
   forming the data blocks into groups comprising N·M data blocks, where N and M are different positive integers and each group includes a set of different data blocks;
   for every group, assigning the N·M data blocks to correspond to elements of an array comprising N rows and M columns;
   calculating respective parity blocks for each of the N rows and M columns, to form (N+M) parity blocks; and
   storing the (N+M) parity blocks and the N·M data blocks in respective storage devices.

2. The method according to claim 1, wherein a total number of the storage devices is greater than or equal to a total number of the data blocks.

3. The method according to claim 1, wherein storing the parity blocks and the data blocks comprises distributing the parity blocks and the data blocks evenly over the storage devices.

4. The method according to claim 1, wherein the data blocks are conveyed to the storage devices in a sequence, and wherein assigning the N·M data blocks to correspond to elements in the array comprises assigning the data blocks to the array according to the sequence.

5. The method according to claim 1, wherein the data blocks are conveyed to the storage devices in a sequence, and wherein assigning the N·M data blocks to correspond to elements in the array comprises assigning the data blocks to the array independently of the sequence.

6. The method according to claim 1, and comprising calculating a further parity block from the (N+M) parity blocks, and storing the further parity block on a further storage device, different from the respective storage devices.

7. The method according to claim 6, wherein a total number of the storage devices is greater than a total number of the data blocks.

8. A method for recovering a given data block from a plurality of data blocks, comprising:
   forming the plurality of data blocks into groups comprising N·M data blocks, where N and M are positive integers and N>M and each group includes a set of different data blocks;
   for every group, assigning the N·M data blocks to correspond to elements of an array comprising N rows and M columns, wherein the given data block is in a respective row comprising the given data block and other data blocks in the respective row;
   calculating respective parity blocks for each of the N rows and M columns, to form (N+M) parity blocks, the parity blocks including a respective-row parity block formed from the given data block and the other data blocks;
   storing the (N+M) parity blocks and the N·M data blocks in respective storage devices; and
   regenerating the given data block using the other data blocks and the respective-row parity block.

9. The method according to claim 8, and comprising calculating a further parity block from the (N+M) parity blocks, and storing the further parity block on a further storage device, different from the respective storage devices.

10. The method according to claim 8, and comprising selecting values for N and M in response to a rate of recovery for the given data block.

11. Apparatus for storing data blocks, comprising:
    a plurality of storage devices; and
    a processor coupled to the plurality of storage devices, wherein the processor is configured to:
    form the data blocks into groups comprising N·M data blocks, where N and M are different positive integers and each group includes a set of different data blocks,
    for every group, assign the N·M data blocks to correspond to elements of an array comprising N rows and M columns,
    calculate respective parity blocks for each of the N rows and M columns, to form (N+M) parity blocks, and
    store the (N+M) parity blocks and the N·M data blocks in respective storage devices comprised in the plurality of storage devices.

12. The apparatus according to claim 11, wherein a total number of the storage devices is greater than or equal to a total number of the data blocks.

13. The apparatus according to claim 11, wherein storing the parity blocks and the data blocks comprises distributing the parity blocks and the data blocks evenly over the storage devices.

14. The apparatus according to claim 11, wherein the data blocks are conveyed to the plurality of storage devices in a sequence, and wherein assigning the N·M data blocks to correspond to elements in the array comprises assigning the data blocks to the array according to the sequence.

15. The apparatus according to claim 11, wherein the data blocks are conveyed to the plurality of storage devices in a sequence, and wherein assigning the N·M data blocks to correspond to elements in the array comprises assigning the data blocks to the array independently of the sequence.

16. The apparatus according to claim 11, wherein the processor is configured to calculate a further parity block from the (N+M) parity blocks, and to store the further parity block on a further storage device, comprised in the plurality of storage devices and different from the respective storage devices.

17. The apparatus according to claim 16, wherein a total number of the storage devices is greater than a total number of the data blocks.

18. The apparatus according to claim 11, wherein:
assigning the N·M data blocks comprises assigning a given data block to be in a respective row comprising the given data block and other data blocks in the respective row, and calculating the respective parity blocks comprises calculating a respective-row parity block from the given data block and the other data blocks,
and wherein the processor is configured to:
regenerate the given data block using the other data blocks and the respective-row parity block.

19. The apparatus according to claim 18, wherein the processor is configured to calculate a further parity block from the (N+M) parity blocks, and to store the further parity block on a further storage device comprised in the plurality of storage devices and different from the respective storage devices.

20. The apparatus according to claim 18, wherein the processor is configured to select values for N and M in response to a rate of recovery for the given data block.

* * * * *